United States Patent
Halsell

(10) Patent No.: US 7,149,500 B2
(45) Date of Patent: Dec. 12, 2006

(54) CHARGE-ALL MODE FOR CALLS IN TELECOMMUNICATION NETWORK

(75) Inventor: Victoria M. Halsell, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 406 days.

(21) Appl. No.: 10/720,591

(22) Filed: Nov. 24, 2003

(65) Prior Publication Data
US 2005/0113064 A1 May 26, 2005

(51) Int. Cl.
*H04M 11/00* (2006.01)
*H04M 15/00* (2006.01)

(52) U.S. Cl. ............ 455/406; 455/407; 455/408; 455/426.1; 455/426.2; 379/114.1; 379/114.2; 379/114.22; 379/114.15; 379/114.28; 379/127.05

(58) Field of Classification Search ........ 455/406, 455/407, 408, 426.1, 426.2; 379/114.15, 379/114.2, 114.22, 127.05
See application file for complete search history.

(56) References Cited

U.S. PATENT DOCUMENTS

| | | | | |
|---|---|---|---|---|
| 5,361,297 A | * | 11/1994 | Ortiz et al. | 379/130 |
| 5,579,379 A | * | 11/1996 | D'Amico et al. | 379/114.01 |
| 6,353,663 B1 | * | 3/2002 | Stevens et al. | 379/114.22 |
| 6,373,931 B1 | * | 4/2002 | Amin et al. | 379/121.01 |
| 6,430,279 B1 | * | 8/2002 | Sawatzki et al. | 379/144.01 |
| 2002/0183040 A1 | * | 12/2002 | Lundstrom et al. | 455/406 |
| 2003/0013434 A1 | * | 1/2003 | Rosenberg et al. | 455/414 |

* cited by examiner

*Primary Examiner*—George Eng
*Assistant Examiner*—Huy Phan

(57) ABSTRACT

A telecommunication network and method of billing a first subscriber associated with a first party to a call for variable call charges normally billed to a second subscriber associated with a second party is provided. The method includes: providing a charge-all mode, connecting the call between the first and second parties, determining whether charge-all mode has been arranged for the first subscriber, determining whether charge-all mode has been arranged for the second subscriber, and, if charge-all mode has been arranged for at least one, but not both, of the first and second subscribers, billing the subscriber associated with the at least one subscriber for variable charges associated with the call. The telecommunication network includes a first network serving the first party and adapted to provide charge-all mode to the first subscriber and a second network serving the second party and adapted to provide charge-all mode to the second subscriber.

35 Claims, 8 Drawing Sheets

CHARGE-ALL MODE FOR CALLS IN TELECOMMUNICATION NETWORK

BACKGROUND OF INVENTION

The invention generally relates to telephone calls in a telecommunication network and, more particularly, to wireless and landline telecommunication networks and associated methods for either a calling party or a called party to voluntarily incur variable call charges normally charged to the other party for a telephone call via a charge-all mode and will be described with particular reference thereto. However, it is to be appreciated that the invention is also amenable to other applications.

In wireless networks today, for mobile-to-mobile calls, the calling party is always charged for airtime and long distance service associated with the call. The called mobile party is also charged for air time associated with the incoming call leg. There is no mechanism for either the calling party or the called party to incur all variable call charges in this type of call scenario. Similarly, in landline networks today, for landline-to-landline calls, the calling party is always charged for long distance service associated with the call. There is no mechanism for the called party to incur all variable call charges in this type of call scenario unless the called party uses a toll-free number or the long distance call is placed as a collect call.

When the called party makes a toll-free number available to calling parties, the called party incurs long distance charges for all incoming calls. However, this does not permit a called party to selectively incur long distance charges on a per-call basis. Notably, the toll-free number is not billed for air time associated with outgoing mobile calls. This relates to any scenario discussed throughout this description where the called party may use a toll-free number.

Collect calls require special dialing procedures by the calling party and permit the called party to either accept or reject the call prior to connection of the call. However, this does not permit a called party to selectively and voluntarily incur long distance charges for any type of call on a per call basis, particularly after connection of the call. Notably, the called party is not billed for air time associated with outgoing mobile calls in a collect call. This relates to any scenario discussed throughout this description where the calling party may place the call as a collect call.

In a wireless/landline network, for mobile-to-landline calls, the calling party is normally charged for air time and long distance service associated with the call. There is no mechanism for the called party to incur all variable call charges in this type of call scenario. For landline-to-mobile calls, the calling party is normally charged for long distance service associated with the call. The called mobile party is also charged for air time associated with the incoming call leg. There is no mechanism for either the calling party or the called party to incur all variable call charges in this type of call scenario.

In a telecommunications network with a call center environment, similar scenarios exist. For example, for mobile-to-call center calls, the calling party is normally charged for air time and long distance service associated with the call. There is no mechanism for the called party to incur all variable call charges in this type of call scenario. For example, even if the called party uses a toll-free number to incur the long distance charges, the calling party is still charged for air time. For landline-to-call center calls, the calling party is normally charged for long distance service associated with the call unless the call center environment has provided a toll-free number. There is no mechanism for the called party to incur all variable call charges in this type of call scenario without having a toll-free number unless the call is placed as a collect call. Additional scenarios in the call center environment relate to calls placed from the call center (e.g., from a telephone in a hotel or motel room). For call center-to-mobile and call center-to-landline calls, the calling party is normally charged for local and long distance service by the call center environment associated with the call. There is no mechanism for the called party to incur all variable call charges in this type of call scenario unless the call is placed as a collect call.

Similar scenarios also exist in a telecommunications network with a pay phone. For example, for pay phone-to-mobile and pay phone-to-landline calls, the calling party is normally charged for local and long distance service associated with the call. There is no mechanism for the called party to incur all variable call charges in this type of call scenario unless the call is placed as a collect call.

Third-party billing is a known technique for billing a third party for long distance services associated with a call. However, the third-party must be contacted and must authorize the billing in order for connection of the call. Moreover, the third-party is not billed for air time associated with mobile calls in a third-party billing arrangement. This relates to any scenario discussed throughout this description where the calling party may place the call with third-party billing.

As can be appreciated from the foregoing, there does not exist a mechanism for wireless subscribers, landline subscribers, and call centers to voluntarily incur all variable call charges normally charged to the other party for a telephone call. Thus, there is motivation for a charge-all mode for calls in a telecommunication network that overcomes the above-referenced problems and others.

BRIEF SUMMARY OF INVENTION

In one aspect of the invention, a method of billing a first subscriber associated with a first party to a call in a telecommunication network for variable charges associated with the call normally billed to a second subscriber associated with a second party to the call is provided. The method includes: a) providing a charge-all mode whereby the first party or first subscriber can arrange to have the first subscriber billed for variable charges associated with the call that are normally billed to the second subscriber and the second party or second subscriber can arrange to have the second subscriber billed for variable charges associated with the call that are normally billed to the first subscriber, b) connecting the call between the first party and the second party, c) determining whether charge-all mode has been arranged for the first subscriber, d) determining whether charge-all mode has been arranged for the second subscriber, and e) if charge-all mode has been arranged for at least one, but not both, of the first and second subscribers, billing the subscriber associated with the at least one subscriber for variable charges associated with the call that are normally billed to the other subscriber.

In another aspect of the invention, a method of applying variable charges associated with a call in a telecommunication network to a first subscriber associated with a first party to the call, wherein at least a portion of the variable charges are normally billed to a second subscriber associated with a second party to the call is provided. The method includes: a) providing a charge-all mode whereby the first party or the first subscriber can activate the charge-all mode thereby arranging to have variable charges associated with the call, including variable charges normally billed to the second subscriber, applied to the first subscriber, b) connecting the call between the first party and the second party, c) determining if charge-all mode was activated for the first subscriber, and d) if charge-all mode was activated for the first subscriber, applying variable charges associated with the call, including variable charges normally billed to the second subscriber, to the first subscriber.

In yet another aspect of the invention, a telecommunication network providing an infrastructure for connecting a telephone call from a first party associated with a first subscriber to a second party associated with a second subscriber is provided. The telecommunication network includes: a first network serving the first party and adapted to provide a charge-all model whereby the first party or first subscriber can arrange to have the first subscriber billed for variable charges associated with the call that are normally billed to the second subscriber and a second network in communication with the first network serving the second party and adapted to provide a charge-all mode whereby the second party or second subscriber can arrange to have the second subscriber billed for variable charges associated with the call that are normally billed to the first subscriber.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
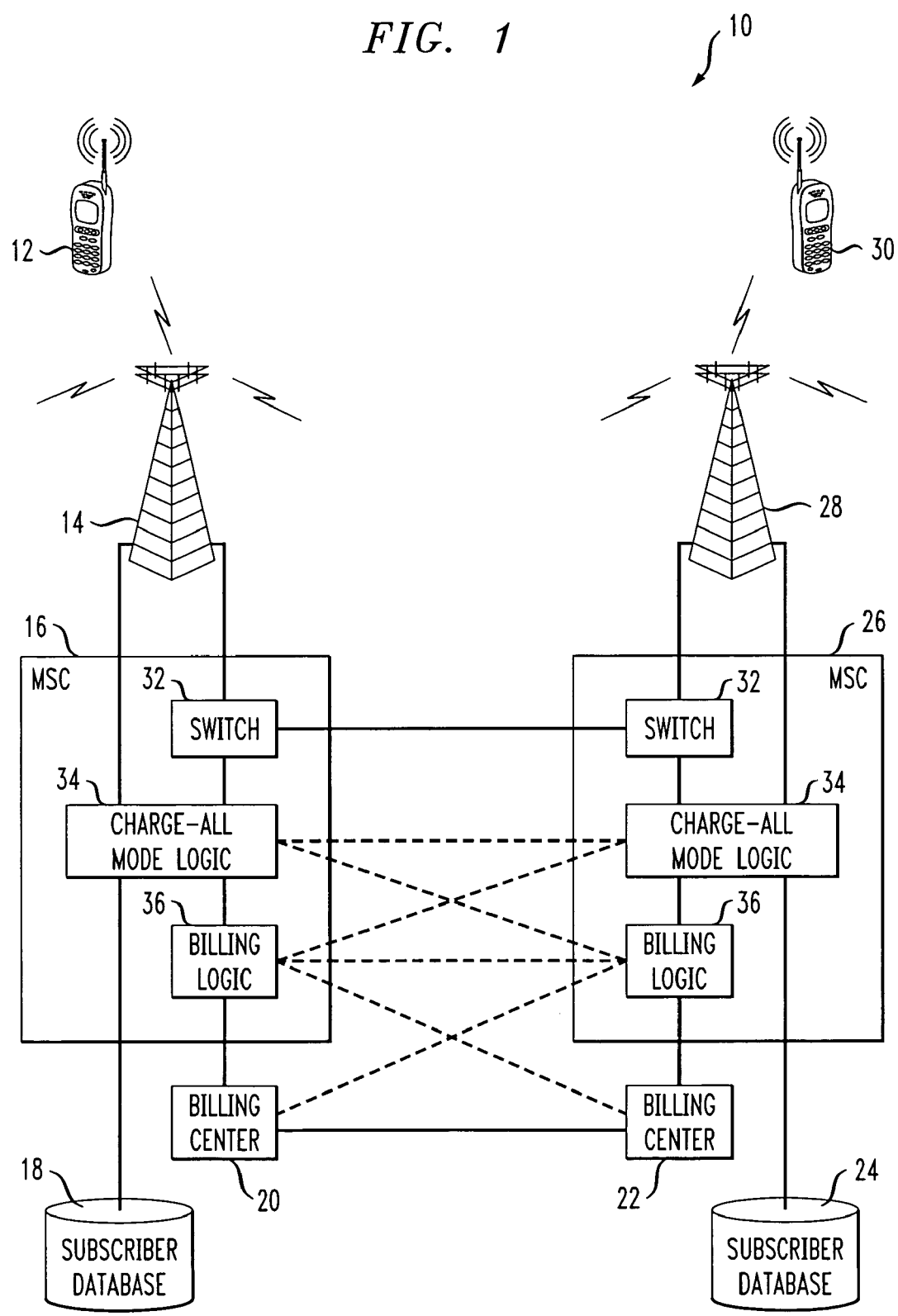
FIG. 1 is a block diagram of an exemplary wireless network providing a charge-all mode for either a calling party or a called party associated with a telephone call.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, an exemplary wireless network 10 providing a charge-all mode for either a calling party or a called party associated with a telephone call is provided. The wireless network 10 includes a first mobile station (MS) 12, a first base station (BS) 14, a first mobile switching center (MSC) 16, a first subscriber database 18, a first billing center 20, a second billing center, 22, a second subscriber database 24, a second MSC 26, a second BS 28, and a second MS 30. The first and second MSCs 16, 26 each include a switch 32, a charge-all mode logic 34, and a billing logic 36. The switch 32, charge-all mode logic 34, and billing logic 36 may be individually implemented in hardware and/or software and may be arranged in any combination of hardware and/or software. The subscriber databases may be external, as shown, or integrated within the corresponding MSCs. The subscriber databases store current service plans and features for subscribers associated with the MSs and are used for location of MSs within the wireless network. A subscriber database may include a home location register (HLR) and a visitor location register (VLR).

The wireless network 10 provides mobile-to-mobile call scenarios where the first MS 12 is the calling party and the second MS 30 is the called party and vice versa. In such scenarios, either the first MS 12 or the second MS 30 can activate a charge-all mode in which the activating party incurs all variable call charges normally charged to the other party.

Activating the charge-all mode is generally a voluntarily request by a subscriber or another user of the first or second MS 12, 30 to have all variable call charges associated with the current call and, optionally, subsequent calls billed to the subscriber's account. The variable call charges may include air time and long distance charges normally billed to the other party. The charge-all mode is typically activated using the MS associated with the activating party. Charge-all mode activation may be accomplished on a per-call basis by pressing a predetermined key sequence on a keypad associated with the MS while a call is ringing or at any time after answering the call. Alternatively, a special key or button on the MS may be provided to activate charge-all mode either independently or in conjunction with an appropriate menu selection. If so, the special key or button can be pressed while the call is ringing or at any time after answering the call to activate charge-all mode on a per-call basis. Activation of charge-all mode while the call is ringing, for example, may be after caller identification (ID) information is viewed.

Activation of charge-all mode after the call is answered, for example, may be after recognizing the caller and/or circumstances surrounding the call. When charge-all mode is activated after a call is answered, there may be an option to include variable call charges incurred after activation or variable call charges retroactive to the beginning of the call in addition to charges after activation. The subscriber may also cancel this type of per-call charge-all mode after its initial activation using any of the above techniques while the call is ringing or at any time after answering the call. When per-call charge-all mode is canceled after a call is answered, there may be an option to cancel variable call charges incurred after cancellation or to also cancel variable call charges retroactive to the beginning of the call.

Another alternative is for a subscriber to setup the MS in a continuous charge-all mode so all variable call charges are billed to the subscriber's account for all incoming calls. This can be accomplished, for example, by: i) the techniques described above for per-call charge-all mode, ii) proceeding through an appropriate setup menu on the MS, iii) contacting customer service associated with the subscriber's wireless service provider using the MS or any suitable telephone device, or iv) proceeding through an appropriate series of web pages associated with the subscriber's wireless service provider using the MS or any suitable computer device having access to the web pages. When activation of charge-all mode is permitted while an incoming call is ringing or after it is answered, an option may be presented for activation of continuous charge-all mode or per-call charge all mode. If the subscriber sets up continuous charge-all mode, all subsequent incoming calls will be billed accordingly without further action in that regard by the subscriber while a call is ringing or after a call has been answered. The subscriber may cancel this type of continuous charge-all mode using any of the above techniques, including using the key sequence or special key while call is ringing or after answering the call. When continuous charge-all mode is canceled after a call is answered, there may be an option to cancel-variable call charges incurred after cancellation or to also cancel variable call charges retroactive to the beginning of the current call.

When the charge-all mode is activated or canceled, a corresponding charge-all mode feature code is communicated, for example, from the subscriber's MS to the corresponding MSC. The charge-all mode logic 34 detects and interprets the charge-all mode feature code, stores the current state for charge-all mode (i.e., per-call mode activated, continuous mode activated, or canceled), and stores the activation or cancellation in a charge-all mode field in the subscriber's account associated with the corresponding subscriber database. A timestamp may be communicated along with the charge-all mode feature code and stored in the corresponding subscriber database within the charge-all mode field or in a timestamp field with a link to the charge-all mode field. A history of charge-all mode activations and cancellations with timestamps may be stored in the corresponding subscriber database.

When an outgoing call is placed and when an incoming call is received, the corresponding MSC checks the current state for charge-all mode in its charge-all mode logic 34. If charge-all mode is currently activated, the charge-all mode logic 34 communicates the activated status of charge-all mode to the billing logic 36 in the same MSC. Otherwise, the billing logic 36 presumes that charge-all mode is not activated and charges are applied to the subscriber associated with the corresponding MS in normal fashion. If the charge-all mode is activated or canceled during the call, the charge-all mode logic 34 in the corresponding MSC communicates the charge-all mode activation or cancellation to the billing logic 36 in the same MSC. The charge-all mode logic 34 in the corresponding MSC may also communicate the charge-all mode activation or cancellation to the billing logic 36 in the other MSC and/or the billing center associated with the other party to the call. A timestamp may be communicated along with the charge all mode activation or cancellation.

The billing logic 36 in the corresponding MSC communicates billing events, including activation and cancellation of charge-all mode to the corresponding billing center. The activation/cancellation status of charge-all mode may be communicated to the billing center in a charge-all mode flag or field along with the billing events. A timestamp may be communicated along with the billing events, particularly activation and cancellation of charge-all mode. Typically, the first and second billing centers 20, 22 associated with a call communicate and exchange billing event information when either party has activated charge-all mode. This resolves which subscriber is actually billed for variable charges associated with both the outgoing and incoming call legs of the call. Additionally, the billing centers will resolve accumulated connect time so that when the activating party is charged for connect time via charge-all mode the other party's subscribed free connect time is not tolled.

If the charge-all mode logic 34 in the corresponding MSD communicates charge-all mode activation to the billing logic 36 in the other MSC, the billing logic 36 in the other MSC may communicate billing events directly to the billing center associated with the subscriber having activated charge-all mode in the same manner described above for the billing logic in the corresponding MSC.

In summary, the charge-all mode logic 34 detects activation and cancellation of charge-all mode by the corresponding MS and checks with the corresponding subscriber database to determine whether the subscriber has subscribed to charge-all mode. If the subscriber has subscribed to charge-all mode, the charge-all mode logic 34 may store the current status of charge-all mode for the subscriber and may communicate the current status to the billing logic 36 and the corresponding subscriber database. The charge-all mode logic 36 may also propagate the subscriber's charge-all mode status to charge-all mode logic 34 and billing logic 36 associated with another party to a call at the time the call is connected or at some other point during the call. The charge-all mode logic 34 may be implemented through hardware, software, or a combination thereof. Moreover, the charge-all mode logic 34 may be integrated with the switch 32 or billing logic 36 within the MSC. It is also possible for the charge-all mode logic 34 implemented in an external network entity associated with the corresponding MSC.

Racing conditions may develop when both parties to a call have activated charge-all mode. For example, when a call is originated both the calling party and called party may have continuous charge-all mode activated. Additionally, at some point while the call is ringing or after it is answered both parties could have per-call and/or continuous charge-all mode activated. In the embodiment depicted in FIG. 1, racing conditions are resolved by the first and second billing centers 20, 22 using the billing event information and pre-determined racing condition resolution logic. For example, racing condition resolution logic may establish a junior and senior party with respect to charge-all mode and allocate all the variable charges to the senior party. The senior party may be based on the first to activate charge-all mode, last to activate charge-all mode, continuous charge-all mode activation, per-call charge-all mode activation, or various combinations thereof. Alternatively, while a racing condition exists, the variable charges could be split 50/50 or some other percentage between the parties to the call. In another arrangement, while the racing condition exists, normal billing rather than charge-all mode billing could be implemented.

In another embodiment, the racing condition may be resolved by propagating the current state of charge-all mode from the calling party's charge-all mode logic 34 when the call is originated and upon each activation or cancellation while the call is ringing and after it is answered to the called party's charge-all mode logic 34. If the called party's charge-all mode logic 34 recognizes a racing condition, subsequent communications between the charge-all mode logic 34 in both MSCs would exchange the information necessary for racing condition resolution logic within the MSCs to resolve the conflict, for example, as described above for resolution by the billing centers.

In yet another embodiment, the racing condition may be resolved by propagating pertinent billing events from the calling party's billing logic 36 when the call is originated and upon each activation or cancellation while the call is ringing and after it is answered to the called party's billing logic 36. If the called party's billing logic 36 recognizes a racing condition, subsequent communications between the billing logic 36 in both MSCs would exchange the information necessary for racing condition resolution logic within the MSCs to resolve the conflict, for example, as described above for resolution by the billing centers.

While FIG. 1 depicts a first BS 14 and a first MSC 16 serving the first MS 12 and a second BS 28 and second MSC 26 serving the second MS 30, it is understood that the wireless network 10 may include additional MSCs and that each MSC may include a plurality of BSs. Each BS provides wireless service to a certain geographical area known as a cell. As an MS moves from cell-to-cell, the BS (and potentially the MSC) serving the moving MS changes based on location of the MS in a different cell. Therefore, it is understood that the wireless network may include additional serving MSCs between the first and second serving MSCs. The charge-all mode logic 34, billing logic 36, subscriber database 18, 24, and billing centers 20, 22 may be associated with any one of the serving MSCs. Additionally, where the subscribers associated with the first and second MS 12, 30 are subscribers to the same wireless service provider, the first and second billing centers 20, 22 may be a common billing center. Similarly, if a given billing center handles billing for multiple wireless service providers, the first and second billing centers 20, 22 may be a common billing center.

In a first scenario for the wireless network of FIG. 1, the first MS 12 is the calling party, the second MS 30 is the called party, and the charge-all mode is activated for a subscriber account associated with the second MS 30. The call is placed from the first MS 12 to a regular E.164 dialed number (DN) associated with the second MS 30 using a normal direct dialing procedure or an indirect dialing procedure (e.g., operator-assisted, calling card, credit card, toll free, etc.). The first MS 12 originates the call with the first MSC 16 via the first BS 14. The first MSC 16 locates the second MS 30 and routes the call to the second MSC 26 which is currently serving the second MS 30. The second MSC 26 notifies the second MS 30 of an incoming call via the second BS 28. When the second MS 30 answers the incoming call, the call is completed and routed from the first MS 12 through the first BS 14, switches 32 in the first and second MSCs 16, 26, and second BS 28 to the second MS 30. In this scenario, if billing events are communicated to both first and second billing centers 20, 22, the first and second billing centers 20, 22 reconcile all billing events so that all variable call charges associated with the call, including air time and long distance charges normally billed to the calling party, are billed to the called party (i.e., the subscriber associated with the second MS 30). Alternatively, if billing events are communicated to the second billing center 22 by both billing logics, reconciliation is not required.

In a second scenario for the wireless network of FIG. 1, the first MS 12 is the calling party, the second MS 30 is the called party, and the charge-all mode is activated for a subscriber account associated with the first MS 12. The call is placed and connected in the same manner as described above for the first scenario. However, in this scenario, if billing events are communicated to both first and second billing centers 20, 22, the first and second billing centers 20, 22 reconcile all billing events so that all variable call charges associated with the call, including air time normally billed to the called party, are billed to the calling party (i.e., the subscriber associated with the first MS 12). Alternatively, if billing events are communicated to the first billing center 20 by both billing logics, reconciliation is not required.

In a third scenario for the wireless network of FIG. 1, the second MS 30 is the calling party, the first MS 12 is the called party, and the charge-all mode is activated for a subscriber account associated with the first MS 12. The call is placed and connected in the same manner as described above for the first scenario, except the outgoing and incoming call legs are reversed. In this scenario, if billing events are communicated to both first and second billing centers 20, 22, the first and second billing centers 20, 22 also reconcile all billing events so that all variable call charges associated with the call, including air time and long distance charges normally billed to the calling party, are billed to the called party. However, in this scenario the subscriber associated with the first MS 12 is billed for all variable charges associated with the call. Alternatively, if billing events are communicated to the first billing center 20 by both billing logics, reconciliation is not required.

In a fourth scenario for the wireless network of FIG. 1, the second MS 30 is the calling party, the first MS 12 is the called party, and the charge-all mode is activated for a subscriber account associated with the second MS 30. The call is placed and connected in the same manner as described above for the first scenario, except the outgoing and incoming call legs are reversed. In this scenario, if billing events are communicated to both first and second billing centers 20, 22, the first and second billing centers 20, 22 also reconcile all billing events so that all variable call charges associated with the call, including air time charges normally billed to the called party, are billed to the calling party like for the second scenario above. However, in this scenario the subscriber associated with the second MS 30 is billed for all variable charges associated with the call. Alternatively, if billing events are communicated to the second billing center 22 by both billing logics, reconciliation is not required.

Figure 2:
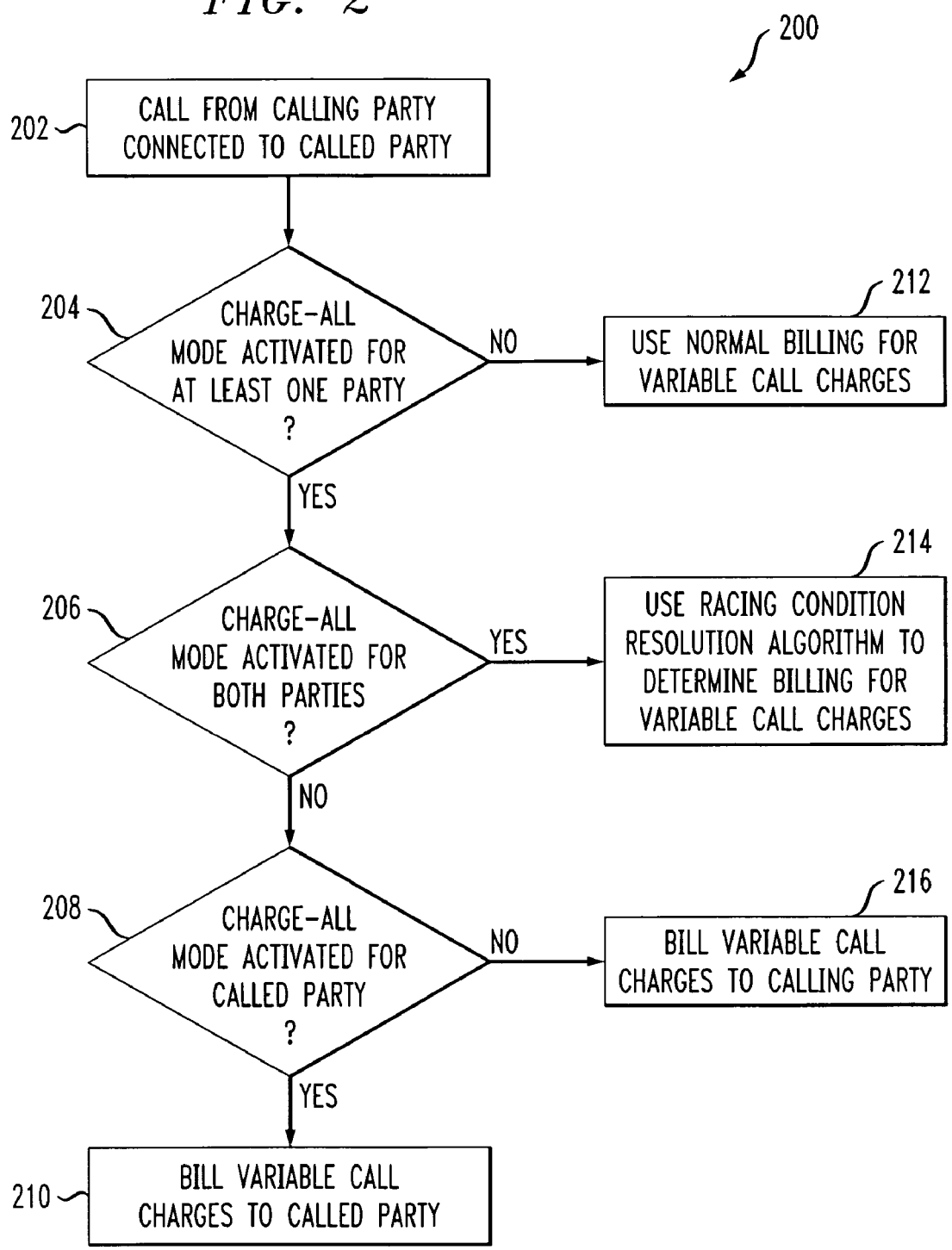
FIG. 2 is a flowchart of an exemplary process for billing variable call charges associated with a telephone call within a telecommunication network implementing a charge-all mode.

With reference to FIG. 2, an exemplary process 200 for billing variable call charges associated with a telephone call within wireless, landline, and wireless/landline telecommunication networks implementing a charge-all mode begins at step 202 when a call from a calling party is connected to the called party. The billing center may determine whether charge-all mode was activated for at least one of the calling and called parties (step 204). If charge-all mode was activated for at least one party the billing center may determine whether charge-all mode was activated for both the calling and called parties (step 206). If charge-all mode was not activated for both parties the billing center may determine whether charge-all mode was activated for the called party (step 208). If charge-all mode was activated for the called party, the billing center will bill variable call charges to the called party (step 210) because it is known that charge-all mode was not also activated for the calling party.

At step 204, if charge-all mode was not activated for at least one party, the billing center will use normal billing procedures to bill variable call charges (step 212). For example, billing the calling party for air time (if applicable), local (if applicable), and long distance charges and billing the called party for air time (if applicable).

At step 206, if charge-all mode was activated for both parties, the billing center will use a racing condition resolution algorithm to determine allocate billing for variable call charges to the calling and/or called party during the racing condition (step 214).

At step 208, if charge-all mode was not activated for the called party, the billing center will bill variable call charges to the calling party (step 216) because it is known that charge-all mode was not also activated for the called party.

The determining steps may be performed in other suitable sequences and the logic in each determining step may be reversed with the same result. For example, step 208 may determine if the calling party activated charge-all mode rather than the called party. Moreover, since either party may activate or cancel charge-all mode during a call, the determining steps of process 200 may be repeated multiple times for a given call. In this regard, the process 200 reviews activations and cancellations of charge-all mode by both parties during the call and provides billing according to the logic described above with reference to FIG. 1. For example, for an initial portion of a given call, variable charges may be billed using normal procedures. Then, due to activation of charge-all mode by the called party during the call, variable charges may be billed to the called party for a second portion of the call. Next, due to activation of charge-all mode by the calling party during the call, variable charges may be billed using the racing condition algorithm for a third portion of the call. Finally, due to cancellation of charge-all mode by the called party during the call, variable charges may be billed to the calling party for a fourth portion of the call.

Figure 3:
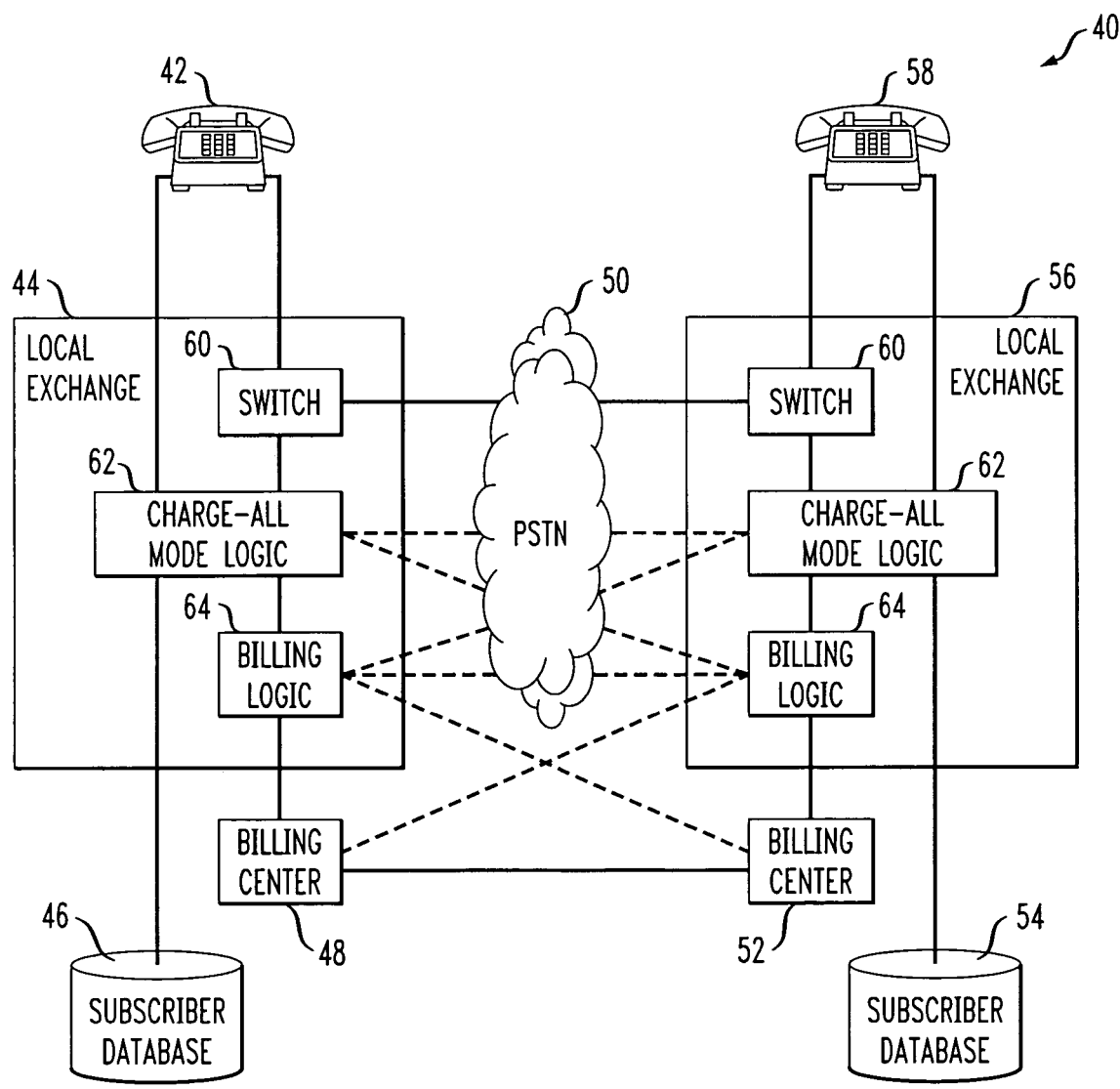
FIG. 3 is a block diagram of an exemplary landline network providing a charge-all mode for either a calling party or a called party associated with a telephone call.

With reference to FIG. 3, an exemplary landline network 40 providing a charge-all mode for either a calling party or a called party associated with a telephone call is provided. The landline network 40 includes a first telephone device 42, a first local exchange 44, a first subscriber database 46, a first billing center 48, a public switched telephone network (PSTN) 50, a second billing center, 52, a second subscriber database 54, a second local exchange 56, and a second telephone device 58. The first and second local exchanges 44, 56 each include a switch 60, a charge-all mode logic 62, and a billing logic 64. The subscriber databases may be external, as shown, or integrated within the corresponding local exchanges. The subscriber databases store current service plans and features for subscribers associated with the telephone devices.

The landline network 40 provides landline-to-landline call scenarios where the first telephone device 42 is the calling party and the second telephone device 58 is the called party and vice versa. In such scenarios, either the first telephone device 42 or the second telephone device 58 can activate a charge-all mode in which the activating party incurs all variable call charges normally charged to the other party. The variable call charges may include long distance charges normally billed to the other party. Therefore, a called party in a landline-to-landline scenario may activate charge-all mode to voluntarily request to have all variable call charges associated with the current call and, optionally, subsequent calls billed to the called party's subscriber account. However, activation of charge-all mode by a calling party in a landline-to-landline scenario is most likely going to merely add unnecessary processing overhead for billing that would be the same as that of normal billing procedures. Thus, the landline-to-landline call scenario where the calling party activates charge-all mode is not dealt with in as much detail as the scenario where the called party activates charge-all mode.

Charge-all mode may be activated or canceled in the landline-to-landline call scenarios in the same manner and at the same times as described above for the mobile-to-mobile call scenarios, except the telephone device is used in place of the MS for the landline-to-landline call scenarios. Likewise, charge-all mode activation may be accomplished on a per-call basis or on a continuous basis in landline-to-landline call scenarios as in mobile-to-mobile call scenarios.

When the charge-all mode is activated or canceled in a landline-to-landline call scenario, a corresponding charge-all mode feature code is communicated, for example, from the subscriber's telephone device to the corresponding local exchange. The switch 60, charge-all mode logic 62, billing logic 64, first and second subscriber databases 46, 54, and first and second billing centers 48, 54 operate and interact with the corresponding telephone device and corresponding local exchange in the same manner as described above for like-named components of the wireless network 10 (FIG. 1) with respect to their operation and interaction with the corresponding MS and MSC.

Likewise, if a racing condition exists in a landline-to-landline call scenario, the same techniques for resolution of variable charge billing described above for the wireless network 10 (FIG. 1) may be implemented in the landline network.

The PSTN 50 in FIG. 3 represents the landline telephone infrastructure connecting the first local exchange 14 to the second local exchange 56. This infrastructure provides communication of the call and associated charge-all mode signaling through the network in the same manner as described above for the wireless network 10 (FIG. 1). Additionally, the first and second billing centers 48, 52 may be a common billing center in various circumstances as described above for the wireless network 10 (FIG. 1).

In a first scenario for the landline network of FIG. 3, the first telephone device 42 is the calling party, the second telephone device 58 is the called party, and the charge-all mode is activated for a subscriber account associated with the second telephone device 58. The call is placed from the first telephone device 42 to a regular E.164 DN associated with the second telephone device 58 using a normal direct dialing procedure or an indirect dialing procedure (e.g., operator-assisted, calling card, credit card, toll free, etc.). The first telephone device 42 originates the call with the first local exchange 44. The first local exchange 44 locates the second telephone device 58 and routes the call to the second local exchange 56 which serves the second telephone device 58. The second local exchange 56 notifies the second telephone device 58 of an incoming call. When the second telephone device 56 answers the incoming call, the call is completed and routed from the first telephone device 42 through the switches 60 in the first and second local exchanges 44, 56 to the second telephone device 58. In this scenario, if billing events are communicated to both first and second billing centers 48, 52, the first and second billing centers 48, 52 reconcile all billing events so that all variable call charges associated with the call, including long distance charges normally billed to the calling party, are billed to the called party (i.e., the subscriber associated with the second telephone device 58). Alternatively, if billing events are communicated to the second billing center 52 by both billing logics, reconciliation is not required.

In a second scenario for the landline network of FIG. 3, the second telephone device 58 is the calling party, the first telephone device 42 is the called party, and the charge-all mode is activated for a subscriber account associated with the first telephone device 42. The call is placed and connected in the same manner as described above for the first scenario, except the outgoing and incoming call legs are reversed. In this scenario, if billing events are communicated to both first and second billing centers 48, 52, the first and second billing centers 48, 52 also reconcile all billing events so that all variable call charges associated with the call, including long distance charges normally billed to the calling party, are billed to the called party. However, in this scenario the subscriber associated with the first telephone device 42 is billed for all variable charges associated with the call. Alternatively, if billing events are communicated to the first billing center 48 by both billing logics, reconciliation is not required.

Figure 4:
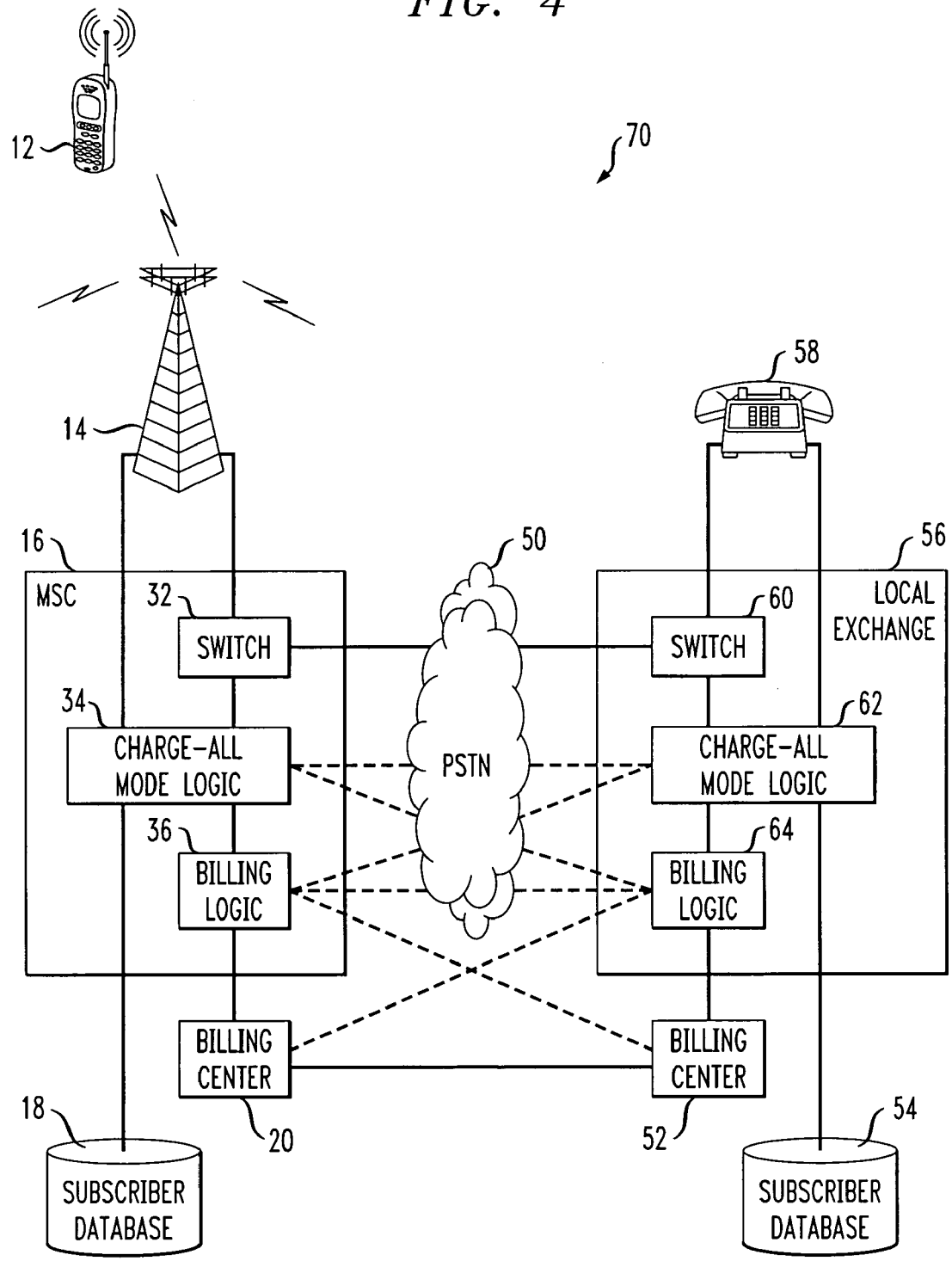
FIG. 4 is a block diagram of an exemplary wireless/landline network providing a charge-all mode for either a calling party or a called party associated with a telephone call.

With reference to FIG. 4, an exemplary wireless/landline network 70 providing a charge-all mode for either a calling party or a called party associated with a telephone call is provided. The wireless/landline network 70 includes the first MS 12, first BS 14, first subscriber database 18, first billing center 20, PSTN 50, second billing center, 52, second subscriber database 54, second local exchange 56, and second telephone device 58. As described above, the first MSC 16 includes the switch 32, charge-all mode logic 34, and billing logic 36 and the second local exchange 44 includes the switch 60, charge-all mode logic 62, and billing logic 64. The subscriber databases may be external, as shown, or integrated within the corresponding MSC and local exchange.

The wireless/landline network 70 provides mobile-to-landline call scenarios where the first MS 12 is the calling party and the second telephone device 58 is the called party and landline-to-mobile call scenarios where the parties are reversed. In such scenarios, either the first MS 12 or the second telephone device 58 can activate a charge-all mode in which the activating party incurs all variable call charges normally charged to the other party. The variable call charges may include air time (if applicable) and long distance charges normally billed to the other party. Therefore, a called party in a mobile-to-landline or landline-to-mobile scenario may activate charge-all mode to voluntarily request to have all variable call charges associated with the current call and, optionally, subsequent calls billed to the called party's subscriber account.

Charge-all mode may be activated or canceled in the mobile-to-landline and landline-to-mobile call scenarios in the same manner and at the same times as described above for the mobile-to-mobile call scenarios, except the second telephone device 58 is used in place of the second MS 30 for the mobile-to-landline and landline-to-mobile call scenarios. Likewise, charge-all mode activation may be accomplished on a per-call basis or on a continuous basis in mobile-to-landline and landline-to-mobile call scenarios as in mobile-to-mobile call scenarios.

When the charge-all mode is activated or canceled in a mobile-to-landline call scenario, a corresponding charge-all mode feature code is communicated, for example, from the first MS 12 or second telephone device 58 to the corresponding first MSC 16 or second local exchange 56. The switch 32, charge-all mode logic 34, billing logic 36, first subscriber database 18 and first billing center 20 operate and interact with the first MS 12, first BS 14, and first MSC 16 in the same manner as described above for the wireless network 10 (FIG. 1). The switch 60, charge-all mode logic 62, billing logic 64, second subscriber database 54, and second billing center 54 operate and interact with the second telephone device 58 and second local exchange 56 in the same manner as described above for like-named components of the wireless network 10 (FIG. 1) with respect to their operation and interaction with the corresponding MS and MSC. Likewise, interaction between the components of the wireless call leg and the components of the landline call leg is in the same manner as described above for the wireless network 10 (FIG. 1) where both call legs are provided by the wireless network.

Likewise, if a racing condition exists in a mobile-to-landline or landline-to-mobile call scenarios, the same techniques for resolution of variable charge billing described above for the wireless network 10 (FIG. 1) may be implemented in the landline network.

Like for the landline network 40 (FIG. 3), the PSTN 50 in FIG. 4 represents the landline telephone infrastructure connecting the second local exchange 56 and interfacing with the first MSC 16 of a wireless network. As described above for the wireless network 10 (FIG. 1), the wireless network depicted by the first BS 14 and first MSC 16 may be expanded to a plurality of BSs and multiple MSCs. This wireless and landline infrastructure provides communication of the call and associated charge-all mode signaling across both wireless and landline networks in the same manner as described above for the wireless network 10 (FIG. 1). Additionally, the first and second billing centers 20, 52 may be a common billing center in various circumstances as described above for the wireless network 10 (FIG. 1).

In a first scenario for the wireless/landline network of FIG. 4, the first MS 12 is the calling party, the second telephone device 58 is the called party, and the charge-all mode is activated for a subscriber account associated with the second telephone device 58. The call is placed from the first MS 12 to a regular E.164 DN associated with the second telephone device 58 using a normal direct dialing procedure or an indirect dialing procedure (e g., operator-assisted, calling card, credit card, toll free, etc.). The first MS 12 originates the call with the first MSC 16 via the first BS 14. The first MSC 16 locates the second telephone device 58 and routes the call to the second local exchange 56 serving the second telephone device 58. The second local exchange 56 notifies the second telephone device 58 of an incoming call. When the second telephone device 58 answers the incoming call, the call is completed and routed from the first MS 12 through the first BS 14, the switch 32 in the first MSC 16, and the switch 60 in the second local exchange 56 to the second telephone device 58. In this scenario, if billing events are communicated to both first and second billing centers 20, 52, the first and second billing centers 20, 52 reconcile all billing events so that all variable call charges associated with the call, including air time and long distance charges normally billed to the calling party, are billed to the called party (i.e., the subscriber associated with the second telephone device 58). Alternatively, if billing events are communicated to the second billing center 52 by both billing logics, reconciliation is not required.

In a second scenario for the wireless/landline network of FIG. 4, the second telephone device 58 is the calling party, the first MS 12 is the called party, and the charge-all mode is activated for a subscriber account associated with the first MS 12. The call is placed and connected in the same manner as described above for the first scenario, except the outgoing and incoming call legs are reversed. In this scenario, if billing events are communicated to both first and second billing centers 20, 52, the first and second billing centers 20, 52 also reconcile all billing events so that all variable call charges associated with the call, including long distance charges normally billed to the calling party, are billed to the called party. However, in this scenario the subscriber associated with the first MS 12 is billed for all variable charges associated with the call. Alternatively, if billing events are communicated to the first billing center 20 by both billing logics, reconciliation is not required.

In a third scenario for the wireless/landline network of FIG. 4, the second telephone device 58 is the calling party, the first MS 12 is the called party, and the charge-all mode is activated for a subscriber account associated with the second telephone device 58. The call is placed and connected in the same manner as described above for the first scenario, except the outgoing and incoming call legs are reversed. However, in this scenario, if billing events are communicated to both first and second billing centers 20, 52, the first and second billing centers 20, 52 reconcile all billing events so that all variable call charges associated with the call, including air time normally billed to the called party, are billed to the calling party (i.e., the subscriber associated with the second telephone device 58). Alternatively, if billing events are communicated to the second billing center 52 by both billing logics, reconciliation is not required.

Figure 5:
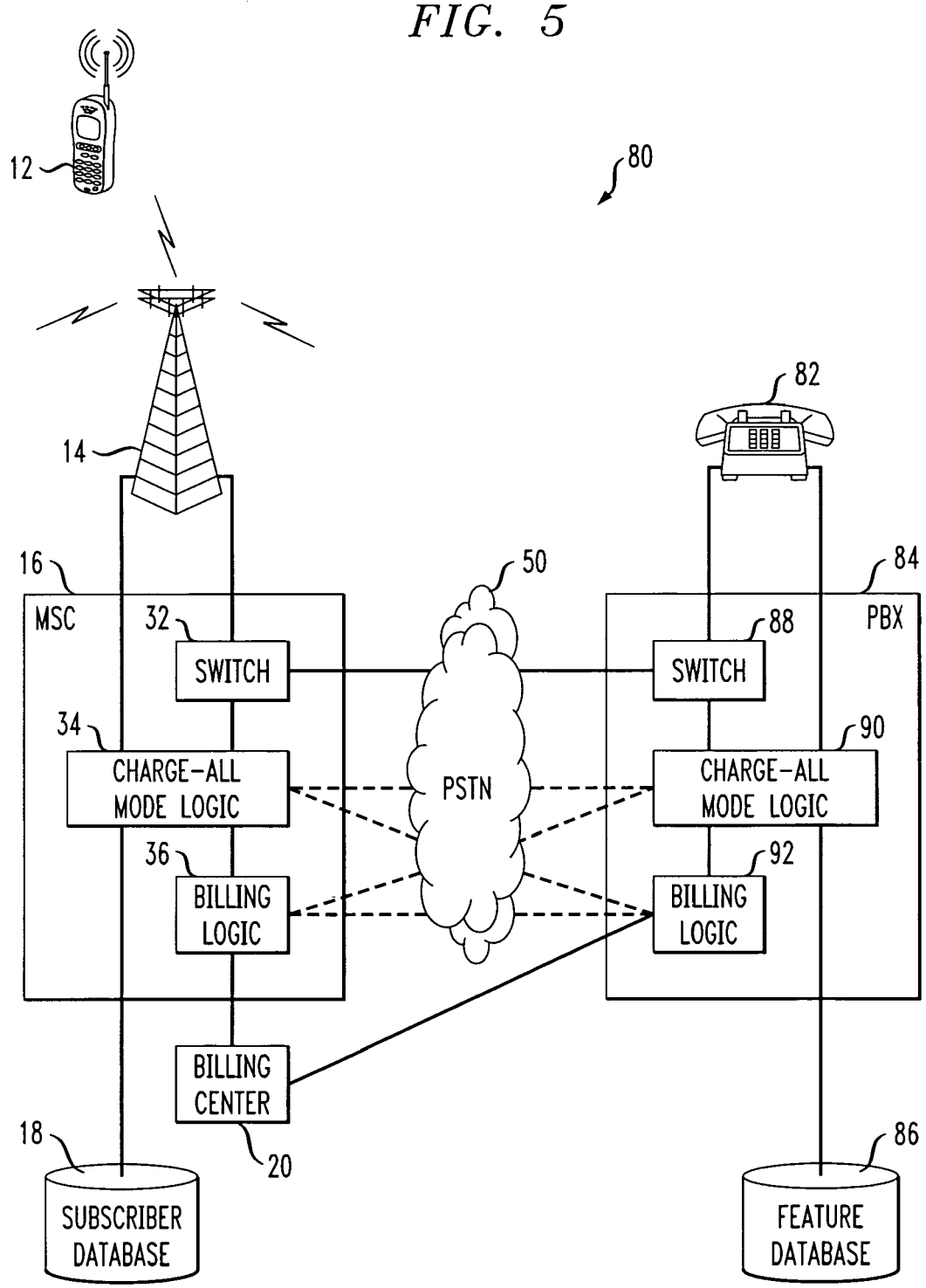
FIG. 5 is a block diagram of another exemplary wireless/landline network providing a charge-all mode for either a calling party or a called party associated with a telephone call.

With reference to FIG. 5, another exemplary wireless/landline network 80 providing a charge-all mode for either a calling party or a called party associated with a telephone call is provided. The wireless/landline network 80 includes the first MS 12, first BS 14, first subscriber database 18, first billing center 20, PSTN 50, a feature database 86, a private branch exchange (PBX) 84, and a second telephone device 82. As described above, the first MSC 16 includes the switch 32, charge-all mode logic 34, and billing logic 36. The PBX 84 includes a switch 88, a charge-all mode logic 90, and a billing logic 92. The second calling device 82, PBX 84, and feature database 86 operate as a call center environment, such as may be used by a customer or public service operation for an organization or by a hotel or motel to provide telephones in its guest rooms. The subscriber database may be external, as shown, or integrated within the MSC. Similarly, the feature database may be external, as shown, or integrated within the PBX. The feature databases store current features for PBX users associated with the telephone devices.

The wireless/landline network 80 operates similar to the previous wireless/landline network 70 (FIG. 4), except that the second telephone device 82 is served by the PBX 84 rather than the second local exchange 56. Since the PBX 84 is privately managed, it does not have subscribers like the public networks. Therefore, the feature database 86 replaces the subscriber database 54 (FIG. 4) and billing functions for the PBX 84 are typically handled internally by the billing logic 92. For purposes of charge-all mode, the feature database 86 operates in the same manner as the subscriber database 54 (FIG. 4). The billing logic 92 in the PBX 84 communicates billing events to the first billing center 20. Otherwise, the wireless/landline network 80 operates in the same manner as the previous wireless/landline network 70 (FIG. 4).

In a first scenario for the wireless/landline network of FIG. 5, the first MS 12 is the calling party, the second telephone device 82 is the called party, and the charge-all mode is activated by a user of the second telephone device 82. This user is typically associated with the organization owning the PBX 84. The call is placed from the first MS 12 to a regular E.164 DN associated with the PBX 84 using a normal direct dialing procedure or an indirect dialing procedure (e.g., operator-assisted, calling card, credit card, toll free, etc.). The first MS 12 originates the call with the first MSC 16 via the first BS 14. The first MSC 16 locates the PBX 84 and routes the call through the PSTN 50 to the PBX 84. The PBX 84 determines that the call should be routed to the second telephone device 82 and notifies the second telephone device 82 of an incoming call. When the second telephone device 82 answers the incoming call, the call is completed and routed from the first MS 12 through the first BS 14, the switch 32 in the first MSC 16, and the switch 88 in the PBX 84 to the second telephone device 82. In this scenario, the first billing center 20 reconciles all billing events so that all variable call charges associated with the call, including air time and long distance charges normally billed to the calling party, are billed to the called party (i.e., the owner of the PBX 84).

In a second scenario for the wireless/landline network of FIG. 5, the second telephone device 82 is the calling party, the first MS 12 is the called party, and the charge-all mode is activated for a subscriber account associated with the first MS 12. The call is placed and connected in the same manner as described above for the first scenario, except the outgoing and incoming call legs are reversed. In this scenario, the first billing center 20 also reconciles all billing events so that all variable call charges associated with the call, including long distance charges normally billed to the calling party, are billed to the called party. However, in this scenario the subscriber associated with the first MS 12 is billed for all variable charges associated with the call.

In a third scenario for the wireless/landline network of FIG. 4, the second telephone device 82 is the calling party, the first MS 12 is the called party, and the charge-all mode is activated by a user of the second telephone device 82. This user is typically associated with the organization owning the PBX 84. The call is placed and connected in the same manner as described above for the first scenario, except the outgoing and incoming call legs are reversed. However, in this scenario, the first billing center 20 reconciles 911 billing events so that all variable call charges associated with the call, including air time normally billed to the called party, are billed to the calling party (i.e., the owner of the PBX 84).

Figure 6:
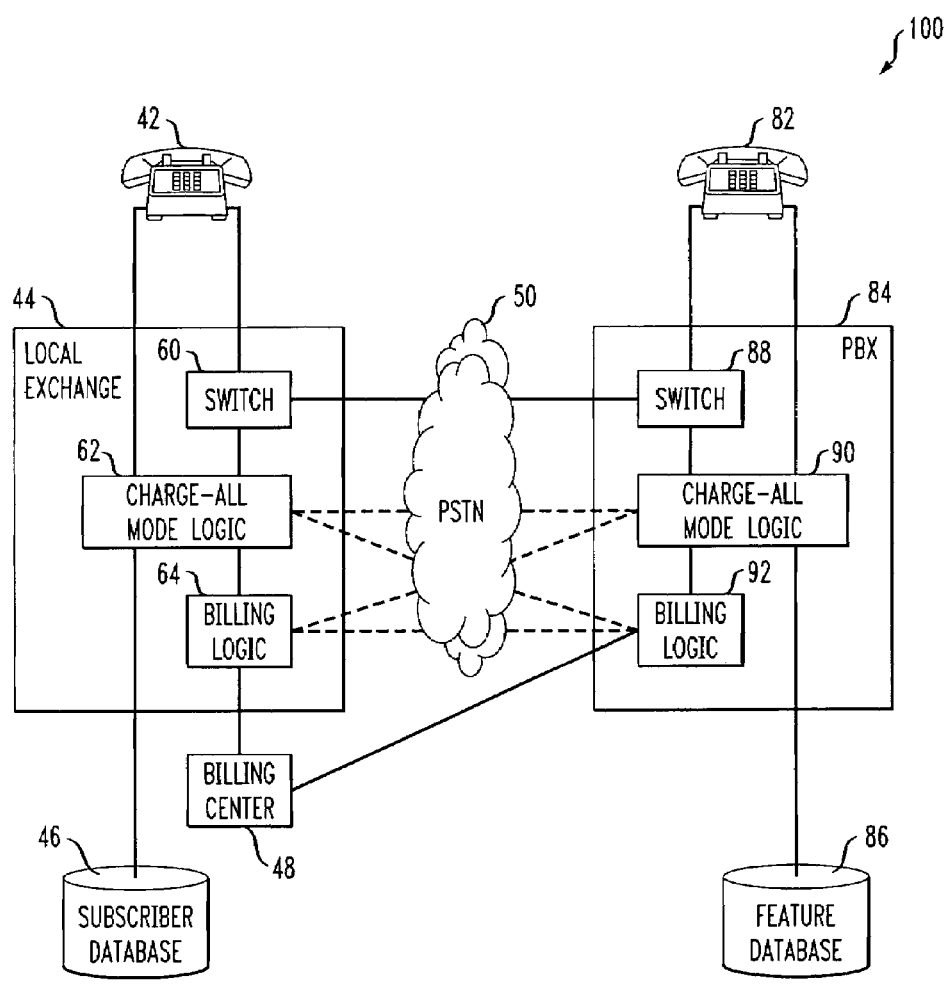
FIG. 6 is a block diagram of another exemplary landline network providing a charge-all mode for either a calling party or a called party associated with a telephone call.

With reference to FIG. 6, another exemplary landline network 100 providing a charge-all mode for either a calling party or a called party associated with a telephone call is provided. The landline network 100 includes the first telephone device 42, first local exchange 44, first subscriber database 46, first billing center 48, PSTN 50, feature database 86, PBX 84, and second telephone device 82. As described above, the first local exchange 44 includes the switch 60, charge-all mode logic 62, and billing logic 64 and the PBX 84 includes the switch 88, charge-all mode logic 90, and billing logic 92. The subscriber database may be external, as shown, or integrated within the local exchange. Similarly, the feature database may be external, as shown, or integrated within the PBX.

The landline network 100 operates similar to the previous landline network 40 (FIG. 3), except that the second telephone device 82 is served by the PBX 84 rather than the second local exchange 56. The PBX 84 and feature database 86 operate in the same manner as described above for the wireless/landline network 80 (FIG. 5). Otherwise, the landline network 100 operates in the same manner as the previous landline network 40 (FIG. 4).

In a first scenario for the landline network of FIG. 6, the first telephone device 42 is the calling party, the second telephone device 82 is the called party, and the charge-all mode is activated by a user of the second telephone device 82. This user is typically associated with the organization owning the PBX 84. The call is placed from the first telephone device 42 toga regular E.164 DN associated with the PBX 84 using a normal direct dialing procedure or an indirect dialing procedure (e.g., operator-assisted, calling card credit card toll free, etc.). The first telephone device 42 originates the call with the first local exchange 44. The first local exchange 44 locates the PBX 84 and routes the call through the PSTN 50 to the PBX 84. The PBX 84 determines that the call should be routed to the second telephone device 82 and notifies the second telephone device 82 of an incoming call. When the second telephone device 82 answers the incoming call, the call is completed and routed from the first telephone device 42 through the switch 60 in the first local exchange 44, and the switch 88 in the PBX 84 to the second telephone device 82. In this scenario, the first billing center 48 reconciles all billing events so that all variable call charges associated with the call, including long distance charges normally billed to the calling party, are billed to the called party (i.e., the owner of the PBX 84).

In a second scenario for the wireless/landline network of FIG. 5, the second telephone device 82 is the calling party, the first telephone device 42 is the called party, and the charge-all mode is activated for a subscriber account associated with the first telephone device 42. The call is placed and connected in the same manner as described above for the first scenario, except the outgoing and incoming call legs are reversed. In this scenario, the first billing center 48 also reconciles all billing events so that all variable call charges associated with the call, including local and long distance charges normally billed to the calling party, are billed to the called party. However, in this scenario the subscriber associated with the first telephone device 42 is billed for all variable charges associated with the call.

Figure 7:
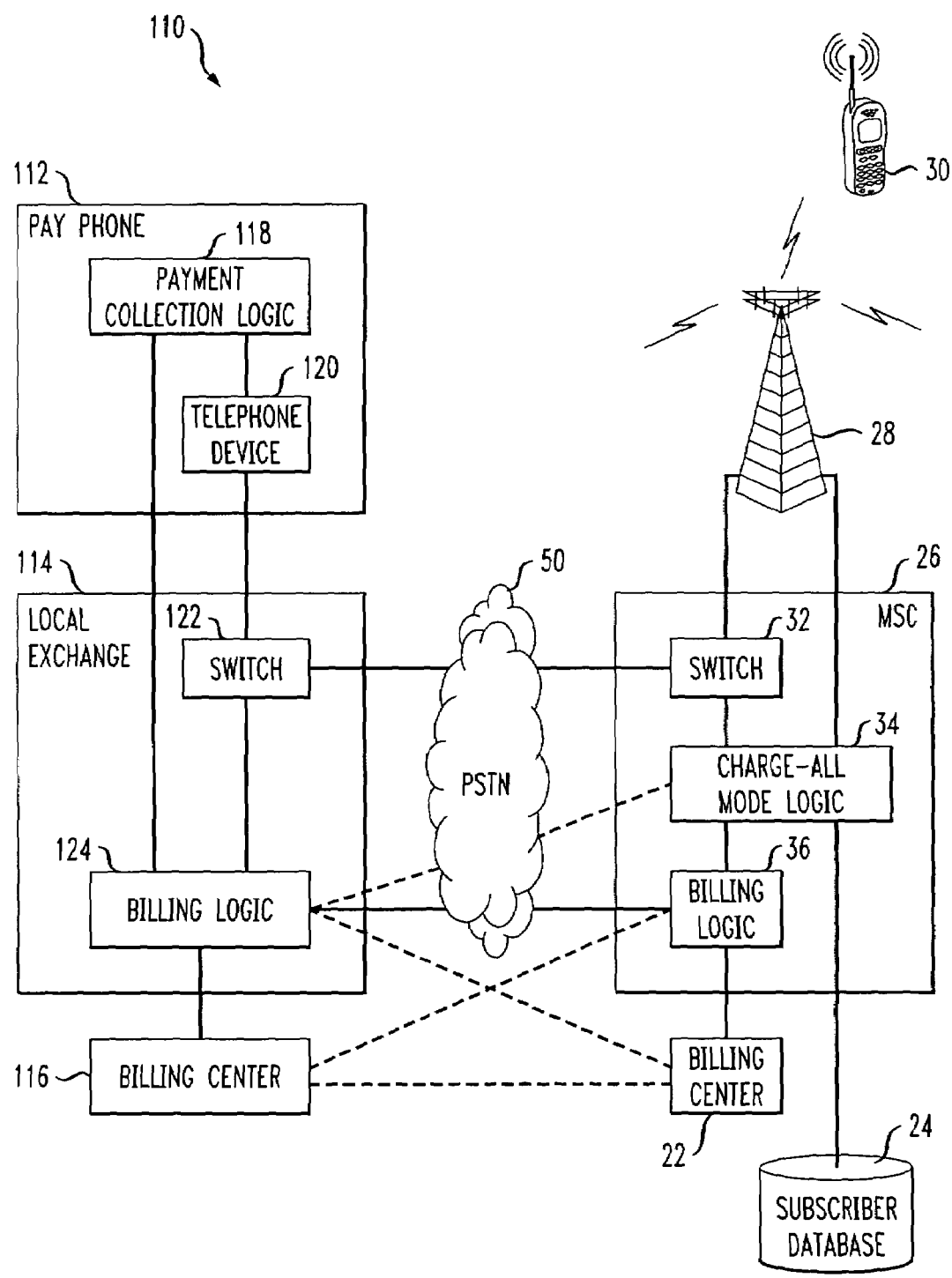
FIG. 7 is a block diagram of yet another exemplary wireless/landline network providing a charge-all mode for either a calling party or a called party associated with a telephone call.

With reference to FIG. 7, yet another exemplary wireless/landline network 110 providing a charge-all mode for either a calling party or a called party associated with a telephone call is provided. The wireless/landline network 110 includes a pay phone 112, a first local exchange 114, a first billing center 116, the PSTN 50, second billing center 22, second subscriber database 24, MSC 26, BS 28, and a second MS 30. The pay phone 112 includes a payment collection logic 118 and a first telephone device 120. The first local exchange 114 includes a switch 122 and a billing logic 124. As described above, the second MSC 26 includes the switch 32, charge all mode logic 34, and billing logic 36. The subscriber database may be external, as shown or integrated within the MSC.

The wireless/landline network 110 operates similar to the previous wireless/landline networks 70 (FIG. 4), 80 (FIG. 5), except that the landline telephone device is the pay phone 112. The pay phone 112 is not associated with a subscriber. Thus, the pay phone typically does not activate charge-all mode with respect to incoming or outgoing calls from the pay phone. As such, a subscriber database is not required in the landline portion of the network nor is charge-all mode logic required in the local exchange 114 serving the pay phone 112. Otherwise, the wireless/landline network 110 operates in the same manner as the previous wireless/landline network 70 (FIG. 4).

In a first scenario for the wireless/landline network of FIG. 7, the pay phone 112 is the calling party, the second MS 30 is the called party, and the charge-all mode is activated for a subscriber account associated with the second MS 30. The call is placed from the pay phone 112 to a regular E.164 DN associated with the second MS 30 using a normal direct dialing procedure or an indirect dialing procedure (e.g., operator-assisted, calling card, credit card, toll free, etc.). The pay phone 112 originates the call with the first local exchange 114. The first local exchange 114 locates the second MS 30 and routes the call through the PSTN 50 to the second MSC 32 serving the second MS 30. The second MSC 32 notifies the second MS 30 of an incoming call. When the second MS 30 answers the incoming call, the call is completed and routed from the pay phone 112 through the switch 122 in the first local exchange 114, and the switch 32 in the second MSC 32, and the second BS 28 to the second MS 30. In this scenario, the first and second billing centers 116, 22 reconcile all billing events so that all variable call charges associated with the call, including local and long distance charges normally billed to the calling party, are billed to the called party (i.e., the subscriber associated with the second MS 30).

Figure 8:
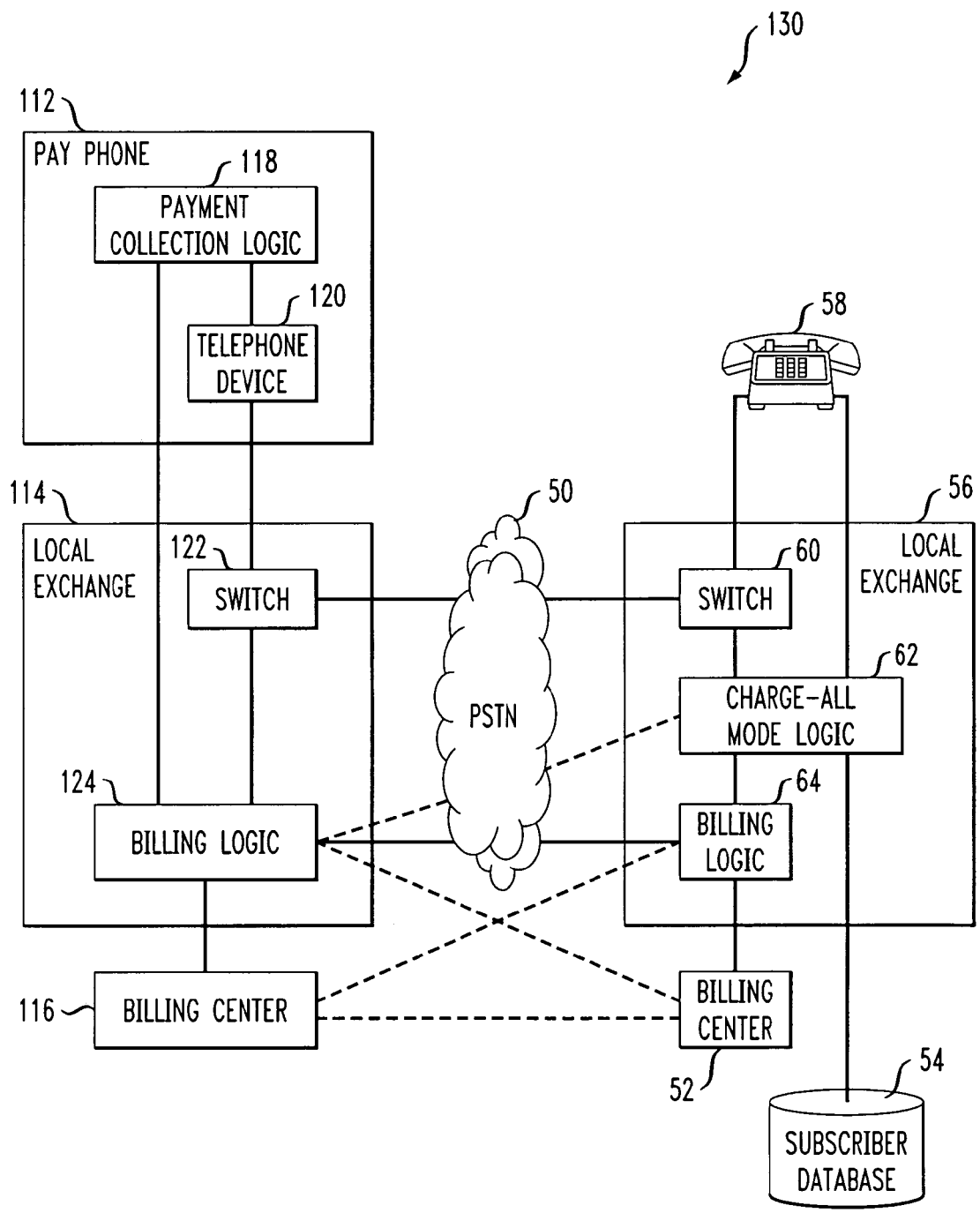
FIG. 8 is a block diagram of yet another exemplary landline network providing a charge-all mode for either a calling party or a called party associated with a telephone call.

With reference to FIG. 8, yet another exemplary landline network 130 providing a charge-all mode for either a calling party or a called party associated with a telephone call is provided. The landline network 130 includes the pay phone 112, first local exchange 114, first billing center 116, PSTN 50, second billing center 52, second subscriber database 54, second local exchange 56, and second telephone device 58. As described above, the pay phone 112 includes the payment collection logic 118 and first telephone device 120, the first local exchange 114 includes the switch 122 and billing logic 124, and the second local exchange 56 includes the switch 60, charge-all mode logic 62, and billing logic 64. The subscriber database may be external, as shown, or integrated within the local exchange.

The landline network 130 operates similar to the previous landline networks 40 (FIG. 3), 100 (FIG. 6), except that one of the landline telephone devices is the pay phone 112. The pay phone 112 and the first local exchange 114 serving the pay phone 112 operate in the same manner as described above for the wireless/landline network 110 (FIG. 7). Otherwise, the landline network 130 operates in the same manner as the previous landline network 40 (FIG. 4).

In a first scenario for the landline network of FIG. 8, the pay phone 112 is the calling party, the second telephone device 58 is the called party, and the charge-all mode is activated for a subscriber account associated with the second telephone device 58. The call is placed from the pay phone 112 to a regular E.164 DN associated with the second telephone device 58 using a normal direct dialing procedure or an indirect dialing procedure (e.g., operator-assisted, calling card, credit card, toll free, etc.). The pay phone 112 originates the call with the first local exchange 114. The first local exchange 114 locates the second telephone device 58 and routes the call through the PSTN 50 to the second local exchange 56 serving the second telephone device 58. The second local exchange 56 notifies the second telephone device 58 of an incoming call. When the second telephone device 58 answers the incoming call, the call is completed and routed from the pay phone 112 through the switch 122 in the first local exchange 114, and the switch 32 in the second local exchange 56 to the second telephone device 58. In this scenario, the first and second billing centers 116, 52 reconcile all billing events so that all variable call charges associated with the call, including local and long distance charges normally billed to the calling party, are billed to the called party (i.e., the subscriber associated with the second telephone device 58).

Several additional practical scenarios are provided to more clearly understand some of the practical benefits of implementing charge-all mode. For instance, the wireless network 10 (FIG. 1) may be used to implement the following practical scenario. USER A, user of a mobile device, receives an incoming call from another mobile device. Normally, the calling mobile subscriber would be charged for the call (e.g, airtime; long distance) when dialing a regular E.164 DN. Instead, USER A has activated charge-all mode to the called mobile device and the calling party does not get billed for any variable charges associated with the call. USER A is charged for the outgoing call leg (i.e., normally charged to the calling party) and the incoming call leg (i.e., normally charged to the called party). This also works in the other direction as well, where the called party, which is a mobile device, does not get charged, as is done today, when the calling party activates charge-all mode.

The wireless network 10 (FIG. 1) or the wireless/landline network 70 (FIG. 4) may be used to implement the following practical scenario. USER A receives a call at their mobile device (which has a regular E.164 number). Upon looking at the caller ID, USER A realizes the call is from their CEO, and wishes to accept all charges for the call. The charges may include airtime charges that the CEO incurs if he/she is on a mobile device or regular landline charges if he/she is using a landline device. USER A then operates a soft key on the keypad or a key sequence that produces a feature code that signals to the network to allow all charges for this call to be billed directly to USER A. Thus, activating charge-all mode for USER A. The CEO never incurs any charges and is unaware of the transaction.

The wireless network 10 (FIG. 1) or wireless/landline network 70 (FIG. 4), 80 (FIG. 5), 110 (FIG. 7) may be used to implement the following practical scenario. USER A has pre-provisioned their mobile device (i.e., mobile DN) to accept all charges for any incoming call. Thus, whenever a call arrives, the network will automatically charge USER A for all call legs of the call without being prompted.

The landline network 40 (FIG. 3), wireless/landline network 70 (FIG. 4), 80 (FIG. 5), or landline network 100 (FIG. 6) may be used to implement the following practical scenario. Client A is calling Business B, and has been on hold for 20 minutes. The client is irate when the call is finally answered because they have incurred 20 minutes of hold time charges. Business B could then activate the charge-all mode for the call/session and client A will not be billed for this long hold time. This is especially important for wireless subscribers that must use precious minutes from a calling plan.

The wireless/landline network 110 (FIG. 7) or landline network 130 (FIG. 8) may be used to implement the following practical scenario. USER A receives a call from their child, who is calling from a pay phone number. As they are talking, the operator prompts the child to put in more money, but the child does not have any more. USER A could then, via a soft key, or other technique described above, activate charge-all mode for their phone. The network is signaled that charge-all mode is activated and the pay phone operator allows the call to resume (i.e., on USER A's bill).

In summary, the forgoing describes a method for a mobile/landline subscriber to provision their mobile/landline device to incur "all charges" associated with a call to/from a landline or wireless network. This includes a charge-all mode feature that may be set by the subscriber in real time or via previous provisioning which will allows them to incur all charges associated with the call, so the calling party does not have to pay (or the called party, as well, if the call is destined for a wireless subscriber). The user is allowed to activate charge-all mode midway through a call/session. In this regard, the user may have the option to incur charges for time already spent or only for time going forward.

Via charge-all mode, a user is able to negotiate how charges for a call will be billed in real time and without operator intervention or call disruption. By simply entering a code. Moreover, a user is able to incur charges associated with a call leg that it would not normally be billed for. Charge-all mode includes various enhancements described above to existing billing call processing.

Businesses may use charge-all mode to eliminate any charges for a client that is forced to dial a regular DN to reach them (i.e., a toll free number is not available). Businesses could also use charge-all mode to accommodate complaining clients-that are upset about service, etc. They could let them know that their concerns are welcomed and there will be no charge for the call. Moreover, businesses could use charge-all mode when a client has been on hold for an unreasonable amount of time.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. For example, the foregoing may be implemented in conjunction with enhanced 911 (E911) networks and equipment as well as regular 911 networks and equipment.

The invention claimed is:

1. A method of billing a first subscriber having a first telephone device associated with a call in a telecommunication network for variable charges associated with the call normally billed to a second subscriber having a second telephone device associated with the call, the method including the steps:

a) providing a charge-all mode whereby the first subscriber can arrange to have the first subscriber billed for variable charges associated with the call that are normally billed to the second subscriber and the second subscriber can arrange to have the second subscriber billed for variable charges associated with the call that are normally billed to the first subscriber;

b) connecting the call between the first telephone device and the second telephone device;

c) determining whether charge-all mode has been arranged for the first subscriber;

d) determining whether charge-all mode has been arranged for the second subscriber;

e) if charge-all mode has been arranged for at least one, but not both, of the first and second subscribers, billing the at least one subscriber for variable charges associated with the call that are normally billed to the other subscriber; and f) if charge-all mode has been arranged for both of the first and second subscribers, performing a racing condition resolution algorithm to determine billing of the variable charges for the call between the first and second subscribers.

2. The method set forth in claim 1 wherein the providing step includes allowing the at least one subscriber to activate and cancel the charge-all mode via the associated one of the first and second telephone devices.

3. The method set forth in claim 2 wherein the associated one of the first and second telephone device includes a special key for activation and cancellation of the charge-all mode.

4. The method set forth in claim 1 wherein the providing step includes providing a customer service operation to the at least one subscriber to activate and cancel the charge-all mode, wherein the customer service operation is associated with a service provider associated with the at least one subscriber.

5. The method set forth in claim 1 wherein the providing step includes providing a web page accessible to the at least one subscriber to activate and cancel the charge-all mode, wherein the web page is associated with a service provider associated with the at least one subscriber.

6. The method set forth in claim 1 wherein the providing step includes providing logic adapted to detect activation and cancellation of the charge-all mode by the at least one subscriber.

7. The method set forth in claim 1 wherein the charge-all mode provided includes at least one of a continuous charge-all mode and a per-call charge-all mode.

8. The method set forth in claim 7 wherein the at least one subscriber activates the charge-all mode prior to origination of the call and the charge-all mode provided is a continuous charge-all mode.

9. The method set forth in claim 7 wherein the at least one subscribes activates the charge-all mode prior to the connecting step (step b)) and after origination of the call and the at least one subscriber selects between activation of the continuous charge-all mode or the per-call charge all mode.

10. The method set forth in claim 7 wherein the at least one subscribes party activates the charge-all mode while the call is connected between the first and second telephone devices and the at least one subscriber selects between activation of the continuous charge-all mode or the per-call charge all mode.

11. The method set forth in claim 1, further including the step:
    g) if charge-all mode has been arranged for none of the first and second subscribers, using normal billing procedures to determine billing of the variable charges for the call between the first and second subscribers.

12. The method set forth in claim 1, the billing step (step e)) further including the step:
    f) communicating a charge-all mode flag and billing events associated with the call to a billing center associated with the at least one subscriber.

13. A method of billing a first subscriber having a first telephone device associated with a call in a telecommunication network for variable charges associated with the call normally billed to a second subscriber having a second telephone device associated with the call, the method including the steps:
    a) providing a charge-all mode whereby the first subscriber can arrange to have the first subscriber billed for variable charges associated with the call that are normally billed to the second subscriber and the second subscriber can arrange to have the second subscriber billed for variable charges associated with the call that are normally billed to the first subscriber;
    b) connecting the call between the first telephone device and the second telephone device;
    c) determining whether charge-all mode has been arranged for the first subscriber;
    d) determining whether charge-all mode has been arranged for the second subscriber; and
    e) if charge-all mode has been arranged for at least one, but not both, of the first and second subscribers, billing the at least one subscriber for variable charges associated with the call that are normally billed to the other subscriber;
    wherein the charge-all mode provided includes at least one of a continuous charge-all mode and a per-call charge-all mode;
    wherein the at least one subscriber activates the charge-all mode while the call is connected between the first and second telephone devices and the at least one subscriber selects between activation of the continuous charge-all mode or the per-call charge all mode; and
    wherein an activating party using one of the first and second telephone devices selects between retroactive application of variable charges for the call to the subscriber associated with the telephone device used by the activating party and application of variable charges for the call to the subscriber associated with the telephone device used by the activating party from the point of activation forward.

14. A method of billing a first subscriber having a first telephone device associated with a call in a telecommunication network for variable charges associated with the call normally billed to a second subscriber having a second telephone device associated with the call, the method including the steps:
    a) providing a charge-all mode whereby the first subscriber can arrange to have the first subscriber billed for variable charges associated with the call that are normally billed to the second subscriber and the second subscriber can arrange to have the second subscriber billed for variable charges associated with the call that are normally billed to the first subscriber;
    b) connecting the call between the first telephone device and the second telephone device;
    c) determining whether charge-all mode has been arranged for the first subscriber;
    d) determining whether charge-all mode has been arranged for the second subscriber; and
    e) if charge-all mode has been arranged for at least one, but not both, of the first and second subscribers, billing the at least one subscriber for variable charges associated with the call that are normally billed to the other subscriber;
    wherein the charge-all mode provided includes at least one of a continuous charge-all mode and a per-call charge-all mode;
    wherein the at least one subscriber activates the charge-all mode while the call is connected between the first and second telephone devices and the at least one subscriber selects between activation of the continuous charge-all mode or the per-call charge all mode; and
    wherein a cancelling party using one of the first and second telephone devices cancels the charge-all mode while the call is connected between the first and second telephone devices and the canceling party selects between retroactive cancellation of variable charges for the call and cancellation of variable charges for the call from the point of cancellation forward.

15. A method of applying variable charges associated with a call in a telecommunication network to a first subscriber associated with a first telephone device used by a first party to the call, wherein at least a portion of the variable charges are normally billed to a second subscriber associated with a second telephone device used by a second party to the call, the method including the steps:
    a) providing a charge-all mode whereby the first party or the first subscriber can activate the charge-all mode to have variable charges associated with the call, including variable charges normally billed to the second subscriber, applied to the first subscriber;
    b) connecting the call between the first telephone device and the second telephone device;
    c) determining if charge-all mode was activated for the first subscriber; and
    d) if charge-all mode was activated for the first subscriber, applying variable charges associated with the call, including variable charges normally billed to the second subscriber, to the first subscriber;
    wherein the first party is a calling party and the second party is a called party in relation to the call.

16. The method set forth in claim 15 wherein the providing step includes providing a telephone device adapted for the first party to activate and cancel the charge-all mode.

17. The method set forth in claim 15 wherein the first party uses a first mobile station to originate the call, the second party uses a second mobile station to answer the call, and the variable charges applied to the first subscriber include air time charges normally applied to the second subscriber.

18. The method set forth in claim 15 wherein the first party uses a landline telephone device to originate the call, the second party uses a mobile station to answer the call, and the variable charges applied to the first subscriber include air time charges normally applied to the second subscriber.

19. The method set forth in claim 15 wherein the first party uses a telephone device associated with a call center environment to originate the call, the second party uses a mobile station to answer the call, and the variable charges applied to the first subscriber include air time charges normally applied to the second subscriber.

20. The method set forth in claim 15 wherein the providing step includes providing a customer service operation to the first party or the first subscriber to activate and cancel the charge-all mode, wherein the customer service operation is associated with a service provider associated with the first subscriber.

21. The method set forth in claim 15 wherein the providing step includes providing a web rage accessible to the first party or the first subscriber to activate and cancel the charge-all mode, wherein the web page is associated with a service provider associated with the first subscriber.

22. The method set forth in claim 15 wherein the providing step includes providing logic adapted to detect activation and cancellation of the charge-all mode by the first party, first subscriber, second party, and second subscriber.

23. The method set forth in claim 15 wherein the charge-all mode provided includes at least one of a continuous charge-all mode and a per-call charge-all mode.

24. The method set forth in claim 15 further including the step:
   e) if charge-all mode has been arranged for both of the first and second subscribers, performing a racing condition resolution algorithm to determine billing of the variable charges for the call between the first and second subscribers.

25. A telecommunication network providing an infrastructure for connecting a telephone call from a first party using a first telephone device associated with a first subscriber to a second party using a second telephone device associated with a second subscriber, including:
   a first network serving the first party and adapted to provide a charge-all mode whereby the first party or first subscriber can arrange to have the first subscriber billed for variable charges associated with the call that are normally billed to the second subscriber, the first network including a first charge-all mode logic adapted to detect activation and cancellation of the charge-all mode by the first party and first subscriber; and
   a second network in communication with the first network serving the second party and adapted to provide a charge-all mode whereby the second party or second subscriber can arrange to have the second subscriber billed for variable charges associated with the call that are normally billed to the first subscriber, the second network including a second charge-all mode logic adapted to detect activation and cancellation of the charge-all mode by the second party and second subscriber,
   wherein at least one of the first and second charge-all mode logics including a racing condition resolution algorithm to determine billing of the variable charges for the call between the first and second subscribers if charge-all mode has been arranged for both of the first and second subscribers.

26. The telecommunication network set forth in claim 25 wherein the first network includes at least one of a wireless network, a landline network, or a call center environment.

27. The telecommunication network set forth in claim 25 wherein the second network includes at least one of a wireless network, a landline network, or a call center environment.

28. The telecommunication network set forth in claim 25, each of the first and second networks including:
   means for connecting the call between the first party and the second party;
   means for determining whether charge-all mode has been arranged for the first subscriber;
   means for determining whether charge-all mode has been arranged for the second subscriber; and
   means for billing the subscriber associated with at least one of the first and second subscribers for variable charges associated with the call that are normally billed to the other subscriber if charge-all mode has been arranged for at least one, but not both, of the first and second subscribers.

29. The telecommunication network set forth in claim 28, further including:
   means for communicating a charge-all mode flag and billing events associated with the telephone call to a billing center associated with at least one of the first and second subscribers.

30. The telecommunication network set forth in claim 25, wherein the first telephone device is adapted for the first party to activate and cancel the charge-all mode; and wherein the second telephone device is adapted for the second party to activate and cancel the charge-all mode.

31. The telecommunication network set forth in claim 30 wherein the first telephone device is selected from the group of a mobile station, a landline telephone device associated with a local exchange, a landline telephone device associated with a call center environment, and a pay phone.

32. The telecommunication network set forth in claim 30 wherein the second telephone device is selected from the group of a mobile station, a landline telephone device associated with a local exchange, a landline telephone device associated with a call center environment, and a pay phone.

33. The telecommunication network set forth in claim 30 wherein at least one of the first and second telephone devices include a special key for activation and cancellation of the charge-all mode.

34. The method set forth in claim 15, wherein the first telephone device is a mobile station.

35. The method set forth in claim 15, wherein the first telephone device is selected from the group of a landline telephone device associated with a local exchange, a landline telephone device associated with a call center environment, and a pay phone.

* * * * *